United States Patent [19]

Byham et al.

[11] 4,222,881

[45] Sep. 16, 1980

[54] OIL RECOVERY PROCESS INVOLVING THE INJECTION OF THICKENED WATER

[75] Inventors: Don E. Byham, Glenolden, Pa.; Edward W. Sheppard, Lambertville; Catherine S. H. Chen, Berkeley Heights, both of N.J.

[73] Assignee: Mobil Oil Corporation, New York, N.Y.

[21] Appl. No.: 901,555

[22] Filed: May 1, 1978

[51] Int. Cl.$^2$ .............................................. E21B 43/22
[52] U.S. Cl. ............................. 252/8.55 D; 166/275; 260/29.6 HN; 525/280; 525/323; 526/265
[58] Field of Search ................ 252/8.55 D; 166/274, 166/275; 526/40, 265; 260/29.6 HN, 878 B, 886; 525/279, 280, 323

[56] References Cited

U.S. PATENT DOCUMENTS

| | | | |
|---|---|---|---|
| 3,085,063 | 4/1963 | Turbak | 252/8.55 |
| 3,399,249 | 8/1968 | Hostetler | 526/40 X |
| 3,744,566 | 7/1973 | Szabo et al. | 166/275 |
| 3,948,783 | 4/1976 | Szabo et al. | 252/8.55 |
| 3,984,333 | 10/1976 | van de Kraats et al. | 252/8.55 |

OTHER PUBLICATIONS

Hart et al., Article in *Journal of Polymer Science*, Vol. XXVIII, Issue No. 118, 1958, pp. 638-640.

*Primary Examiner*—Herbert B. Guynn
*Attorney, Agent, or Firm*—C. A. Huggett; William D. Jackson

[57] ABSTRACT

Waterflood oil recovery process involving the use of an amphoteric polyelectrolyte as a thickening agent for mobility control. The amphoteric polyelectrolyte is a copolymer of a quaternary vinyl pyridinium sulfonate and a water-insoluble alpha olefin or hydrogenated diene. Specifically disclosed are vinyl pyridinium sulfonate-styrene block copolymers. The amphoteric polyelectrolytes are stable in high temperature and high brine environments.

10 Claims, 1 Drawing Figure

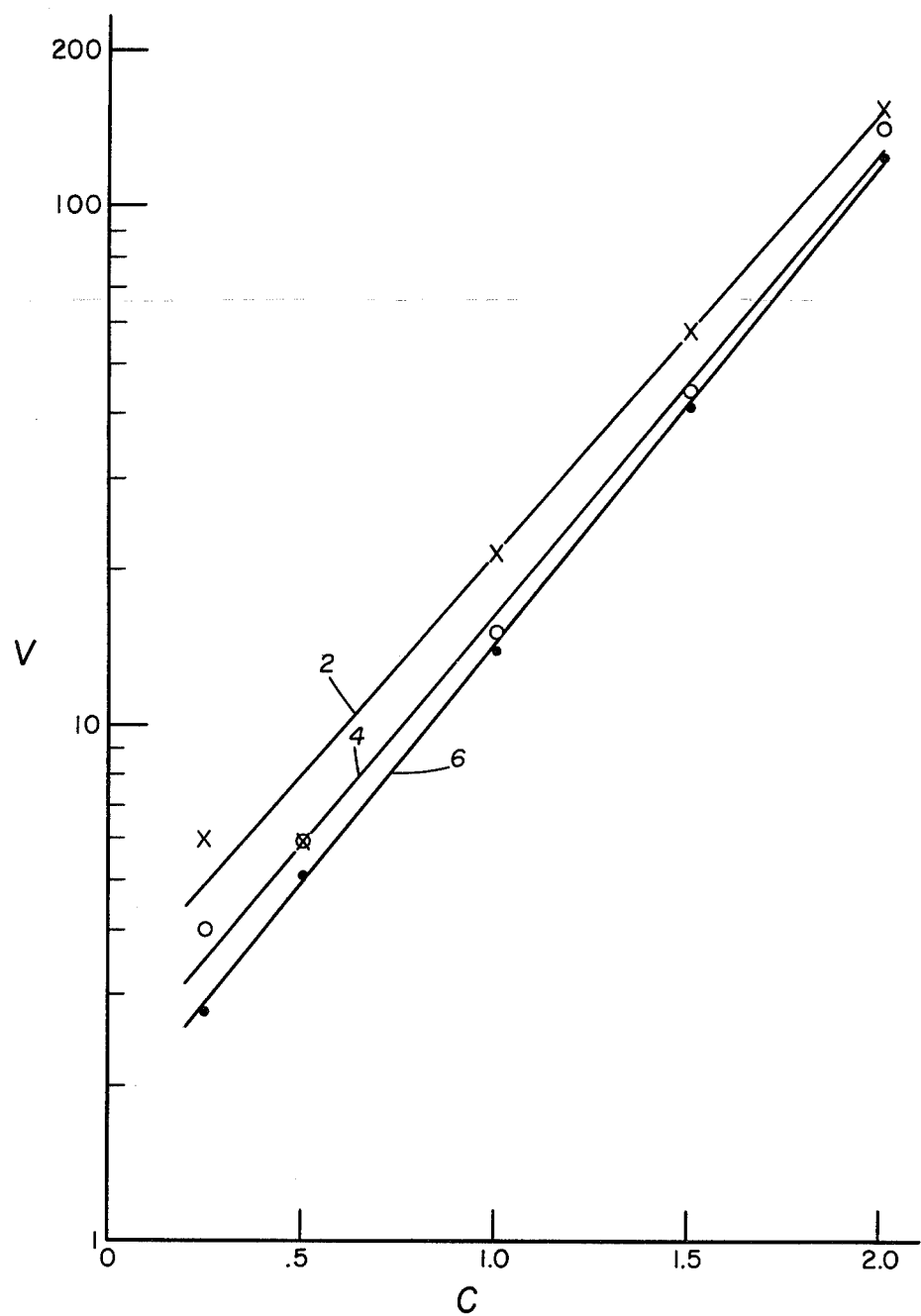

OIL RECOVERY PROCESS INVOLVING THE INJECTION OF THICKENED WATER

BACKGROUND OF THE INVENTION

This invention relates to the recovery of oil from subterranean oil reservoirs and more particularly to improved waterflooding operations involving the injection of thickened aqueous solutions of copolymers of amphoteric polyelectrolytes for mobility control.

In the recovery of oil from oil-bearing reservoirs, it usually is possible to recover only minor portions of the original oil in place by the so-called primary recovery methods which utilize only the natural forces present in the reservoir. Thus a variety of supplemental recovery techniques have been employed in order to increase the recovery of oil from subterranean reservoirs. The most widely used supplemental recovery technique is waterflooding which involves the injection of water into an oil-bearing reservoir. As the water moves through the reservoir, it acts to displace oil therein to a production system composed of one or more wells through which the oil is recovered.

One difficulty often encountered in waterflooding operations is the relatively poor sweep efficiency of the aqueous displacing medium; that is, the injected displacing medium tends to channel through certain portions of the reservoir as it travels from the injection system to the production system and to bypass other portions. Such poor sweep efficiency or macroscopic displacement efficiency may be due to a number of factors such as differences in the mobilities of the injected displacing liquids and the displaced reservoir oil and permeability variations within the reservoir which encourage preferential flow through some portions of the reservoir at the expense of other portions.

Various techniques have been proposed in order to improve the sweep efficiency of the injected displacing medium and thus avoid premature breakthrough at one or more of the wells comprising the production system. The most widely used procedure involves the addition of thickening agents to the injected displacing medium in order to increase the viscosity thereof and thus decrease its mobility to a value equal to or less than the mobility of the displaced reservoir oil, resulting in a "mobility ratio" of oil to water which is less than or equal to one. Many polymeric thickening agents including both anionic and cationic polyelectrolytes have been proposed for use in such mobility control operations. Thus, U.S. Pat. No. 3,085,063 to Turbak discloses waterflooding in which the water is thickened by the addition of polyvinyl aromatic sulfonates such as sulfonated polystyrene and copolymers of such vinyl aromatic sulfonates. Similarly, U.S. Pat. No. 3,984,333 to van de Kraats et al. discloses waterflooding involving the injection of an aqueous solution thickened by block copolymers in which the water-soluble blocks are sulfonated polyvinylarenes and the relatively water-insoluble blocks are polymerized alpha olefins and/or hydrogenated dienes such as polyisoprene and polybutadiene. Synthetic anionic polymers such as those disclosed in Turbak and Kraats et al., as well as the more widely used partially hydrolyzed polyacrylamides, suffer a number of disadvantages in actual operations. Where the injected water or the reservoir water contains significant quantities of dissolved inorganic salts, their viscosity yield is decreased materially. In addition, the presence of divalent cations such as magnesium and calcium tend to cause precipitation of these anionic polymers. Biopolymers such as the Xanthomonas polysaccharides retain much of their thickening power in the presence of inorganic salts and thus may be employed in high brine evironments. However, in the absence of special stabilizing procedures, these polysaccharides are subject to severe thermal-hydrolytic degradation at temperatures of about 60° C. and above which limits their application in relatively high temperature reservoirs.

It also has been proposed to employ cationic polyelectrolytes as thickeners in waterflood applications. Thus, U.S. Pat. No. 3,744,566 to Szabo et al. discloses the use of a water-soluble polymer containing at least 1% cationic monomer units characterized as acrylamido quaternary ammonium halides, sulfonates, carboxylates, etc. The cationic monomer may be copolymerized with other copolymerizable water-soluble monomers such as acrylamide, alkali metal styrene sulfonates, and N-vinylpyridine. The polymers disclosed in Szabo et al. are said to be particularly useful in brines having over 2% dissolved solids.

SUMMARY OF THE INVENTION

In accordance with the present invention, there is provided a new and improved waterflooding process employing an amphoteric polyelectrolyte which is an effective thickening agent at high temperatures and in saline aqueous media which include the presence of significant quantities of divalent metal ions. The invention is carried out in a subterranean oil-containing reservoir penetrated by spaced injection and production systems. In accordance with the invention, at least a portion of the injected fluid is a thickened aqueous liquid containing a water-soluble copolymer including at least 20% by weight of quaternary pyridinium sulfonate monomers of the formula:

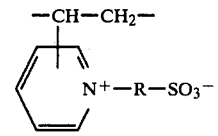

wherein R is a $C_1$–$C_4$ alkylene group. The quaternary pyridinium sulfonate is copolymerized with a water-insoluble alpha olefin or hydrogenated diene. A preferred application of the present invention is in oil reservoirs in which the formation waters exhibit high salinities and/or divalent metal ion concentrations or in instances in which the available injection waters exhibit high salinities and/or divalent metal ion concentrations. Thus, a preferred application of the invention is in cases where the formation waters or the injection waters or both contain divalent metal ion concentrations of at least 0.1 weight percent.

In a preferred embodiment of the invention, the amphoteric polymer employed as a thickening agent is a vinylpyridinium sulfonate-styrene block copolymer characterized by the formula:

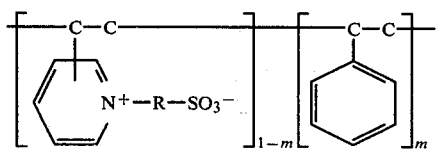

wherein R is a $C_1$-$C_4$ alkylene group and m is a mole fraction within the range of 0.2–0.9.

BRIEF DESCRIPTION OF THE DRAWING

The drawing is a graph illustrating the relationship between the concentration of the amphoteric polyelectrolyte and low shear rate viscosity.

DESCRIPTION OF THE SPECIFIC EMBODIMENTS

The present invention involves a process for the recovery of oil employing as a water thickening agent an amphoteric polyelectrolyte having both quaternary ammonium groups and sulfonate groups covalently bonded to the polymer structure. The amphoteric function is provided by vinyl pyridinium sulfonate in which a $C_1$-$C_4$ alkylene group links the anionic sulfonate group to the cationic quaternary pyridinium group. The amphoteric polyelectrolyte contains pyridinium sulfonate monomers and copolymerizable water-insoluble monomers to form either random or block copolymers. Block copolymers are preferred for use in carrying out the present invention since comparable viscosity yields are produced at significantly lower molecular weight for the block copolymers than for the random copolymers and the block copolymers exhibit good shear stability. The amphoteric polyelectrolytes may be linear block copolymers of AB, ABA, or BAB configuration or they may be of nonlinear configuration such as may be formed by grafting of two or more polymer chains. In the graft polymer configurations, the polymer chains themselves may be homopolymeric or copolymeric in nature. It is desirable to employ block copolymers of narrow molecular weight distribution in order to retard permanent shear degradation under the high shear stress attendant to injection of the polymer solution into the reservoir. Preferably the block copolymer has a molecular weight distribution as defined by the ratio of the weight average molecular weight ($M_w$) to the number average molecular weight ($M_n$) within the range of 1.0 to 1.4.

The water-soluble polymer blocks comprise quaternary pyridinium sulfonate monomers characterized by the formula:

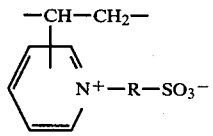  (1)

wherein R is a $C_1$-$C_4$ alkylene group. Polymers of such quaternary pyridinium sulfonates are described by Hart et al., "New Polyampholytes: The Polysulfobetaines", Journal of Polymer Science, Vol. XXVIII, Issue No. 118, pp. 638–640 (1958). As disclosed by Hart et al., homopolymers or acrylamide copolymers of polyvinylpyridine butylsulfobetaine can be prepared by reaction of vinylpyridine with butane sultone and subsequent polymerization or by reaction of polyvinylpyridine with butane sultone.

The water-insoluble blocks of the amphoteric polyelectrolyte are derived from hydrogenated dienes or alpha olefins. Thus, the water-insoluble blocks may be formed by polymerization of dienes such as isoprene, butadiene, 2,3-dimethylbutadiene, and chloroprene. The polymerized dienes are then hydrogenated to convert the diene polymer blocks to essentially the equivalent of alpha-olefin polymer blocks. Alternatively, the water-insoluble blocks may be provided by alpha-olefin polymers such as polyisobutene, polyethylene, polypropylene, and other water-insoluble vinyl addition polymers such as vinylarene polymers and water-insoluble acrylic polymers. Examples of vinylarenes which may be copolymerized with the vinylpyridine include styrene, alpha-methyl styrene, vinyl toluene, and vinyl naphthalene. Examples of more polar but still water-insoluble acrylic polymer blocks are polyacrylonitrile and polymethylacrylonitrile.

The amphoteric polyelectrolyte employed in the present invention may be formed by copolymerization of vinylpyridine with the appropriate alpha olefin or hydrogenated diene with subsequent sulfonation. Random copolymers may be prepared by free radical initiated copolymerization of vinylpyridine and the water-insoluble monomer. Block copolymers may be prepared by anionic copolymerization of vinylpyridine and the water-insoluble monomer by serially feeding the monomers to the polymerization system one at a time in a manner to form the desired block structure. The molecular weight distribution of the block copolymer may be retained within narrow limits due to the "living" nature of the polymerization process. The block or random copolymers may be sulfonated by quaternization of the pyridine functional group with a sultone or a halogenated alkane sulfonate. Thus, pyridinium sulfonate monomers as characterized by formula (1) of the type in which R is a $C_3$ or $C_4$ group may be prepared by reacting the vinylpyridine copolymer with propane sultone or butane sultone in the manner described in the article by Hart et al. Pyridinium sulfonates in which the alkylene linkage contains 1 or 2 carbon atoms may be prepared by reacting the vinylpyridine copolymer with a halogenated alkane sulfonate such as chloromethane sulfonate or chloroethane sulfonate.

In experimental work relative to the invention, viscosity measurements were taken of amphoteric polyelectrolyte solutions under various conditions of temperature and salinity. In each set of experiments the polyelectrolyte employed was a block copolymer of vinyl pyridinium propylene sulfonate and styrene. This polymer was derived by quaternization of a block copolymer containing 25% styrene and 75% 2-vinylpyridine and having a molecular weight of about 100,000. In preparing the polyelectrolyte, the vinylpyridine-styrene copolymer was dissolved in tetrahydrofuran and a molar equivalent amount of propane sultone was added to the solution and the mixture then refluxed for 16 hours. A gelatinous polymer settled out of the refluxed solution. Excess water was then added to the mixture with stirring and the homogenized mixture was dialyzed against distilled water to remove the excess small molecules. The dialyzed solution was freeze-dried and the polymer was obtained in the form of a white solid. This procedure produced 100% quaternization of the vinylpyridine portion of the polymer as indicated by elemental analysis.

The aqueous liquids employed in the experimental work were mixed brines, designated herein as brines "A", "B", "C", and "D". Brine A contained 13.2 weight percent sodium chloride, 9500 ppm calcium ions, and 1877 ppm magnesium ions to provide a total salinity of 16.6 weight percent. Brine B contained 6.4 weight percent sodium chloride, 9272 ppm calcium ions, and 2552 ppm magnesium ions to provide a total salinity of 10 weight percent. Brine C contained 6.2 weight percent sodium chloride, 250 ppm magnesium ions, 1160 ppm calcium ions, and 92 ppm barium ions to provide a total salinity of 6.6 weight percent. Brine D contained 3.9 weight percent sodium chloride, 5563 ppm calcium ions, and 1531 ppm magnesium ions to provide a total salinity of 6.0 weight percent. In each of the brines employed, the divalent metal ions were present in the form of their chloride salts. In describing the invention and the supporting experimental data, weight percents set forth herein are calculated on a weight (solute)/volume (solution) basis. Thus, brine A, for example, had a total dissolved salts content of 16.6 grams per deciliter of solution.

The results of this experimental work are shown in Tables I, II, and III. In each of these tables the first column gives the shear rate at which the viscosity measurements were taken with a Brookfield viscometer. In Table I the viscosities measured at room temperature (about 24° C.) for the polymer in brine D at concentrations of 0.25, 0.5, 1.0, 1.5, and 2.0 weight percent are set forth in columns 2 through 6, respectively. The critical micelle concentration (CMC) at which a sharp increase in viscosity yield occurs for this block copolymer is between 1 and 1.5 weight percent. However, as indicated by the data in Table I, the polymer has a significant thickening effect at low shear rates at concentrations well below the CMC. In waterflood processes because of the radial flow geometry associated with the flow of fluid to or from a well, the flow velocity and thus the shear rates are extremely high immediately adjacent the well and relatively low at more remote locations in the reservoir. Typically, the shear rate in the intermediate portion of the reservoir between the injection and production wells is on the order of one sec$^{-1}$.

The low shear rate viscosities given in Table I are presented in the drawing in which the curves shown are graphs of the log of the viscosity V, in centipoises, on the ordinate versus the polymer concentration C, in weight percent, on the abscissa. In the drawing, curves 2, 4, and 6 are straight lines drawn interpretively through the viscosity data points at shear rates of 0.37, 0.73, and 1.84 sec$^{-1}$, respectively. As can be seen from an examination of the drawing, extrapolation of curves 2, 4, and 6 to a polymer concentration of 0.1 percent (1,000 ppm) would still indicate a two- to threefold increase in viscosity. As described in greater detail hereinafter, the viscosity yield of the amphoteric polyelectrolytes is a function not only of the polymer molecular weight but also of the relative amount of water-insoluble blocks in the copolymer. Thus, in regard to the vinyl pyridinium sulfonate-styrene copolymer described above, similar viscosity yields can be achieved at lower polymer concentrations by increasing the molecular weight of the copolymer or the mole fraction of the styrene blocks, or both.

TABLE I

| Shear Rate, Sec$^{-1}$ | Polymer Conc., % | 0.25 | 0.5 | 1.0 | 1.5 | 2.0 |
|---|---|---|---|---|---|---|
| 0.37 | Viscosity, cp. | 6.00 | 6.00 | 22.00 | 58.00 | 156.00 |
| 0.73 | | 4.00 | 6.00 | 15.00 | 44.00 | 142.00 |
| 1.84 | | 2.80 | 5.20 | 14.00 | 41.60 | 127.20 |
| 3.67 | | 2.20 | 4.20 | 14.00 | 38.60 | 123.40 |
| 7.34 | | 1.90 | 3.80 | 13.40 | 40.20 | — |
| 14.68 | | 1.85 | 3.70 | 12.75 | 37.15 | — |
| 36.70 | | 1.84 | 3.50 | 11.56 | — | — |
| 73.40 | | 1.84 | 3.50 | — | — | — |

Table II sets forth the viscosities observed for solutions of the vinyl pyridinium sulfonate-styrene copolymer in brine C at room temperature and at 89° C. In Table II the second and third columns give the room temperature viscosities for polymer concentrations of 1.0 and 1.5 weight percent, respectively, and the fourth and fifth columns give the viscosities at 89° C. at copolymer concentrations of 1.0 and 1.5 weight percent, respectively. As can be seen from an examination of the data in Table II, the decrease in viscosity associated with the 65° C. rise in temperature is relatively small. Furthermore, the specific viscosities of the polymer solutions, as indicated by a water viscosity of about 0.3 cp. at 89° C. as contrasted with a viscosity of about 0.9 cp. at room temperature, are somewhat higher at 89° C. than at room temperature.

TABLE II

| Shear Rate, Sec$^{-1}$ | Polymer Conc., % | Room Temp. | | 89° C. | |
|---|---|---|---|---|---|
| | | 1.0 | 1.5 | 1.0 | 1.5 |
| 0.37 | Viscosity, cp. | 20.00 | 54.00 | 16.00 | 30.00 |
| 0.73 | | 22.00 | 48.00 | 11.00 | 26.00 |
| 1.84 | | 14.80 | 42.40 | 6.80 | 18.40 |
| 3.67 | | 13.00 | 38.60 | 5.60 | 15.80 |
| 7.34 | | 12.30 | 35.70 | 5.00 | 14.00 |
| 14.68 | | 11.70 | 32.75 | 4.65 | 12.40 |
| 36.71 | | 10.80 | — | 4.30 | 10.98 |

Table III presents a comparison of viscosity measurements observed for the pyridinium sulfonate-styrene copolymer in brines A, B, and C at 89° C. In Table III, the second and third columns set forth the viscosities measured for polymer concentrations of 1.0 and 1.5 weight percent, respectively, in brine A. Viscosity data for these same polymer concentrations are set forth for polymer solutions in brine B in columns 4 and 5, and for polymer solutions in brine C in columns 6 and 7. It will be recalled that brines A, B, and C have salinities of 16.6, 10, and 6.6 weight percent, with divalent metal ion concentrations ranging from 1500 ppm for brine C to between 11,000–12,000 ppm for brines A and B. From an examination of the data set forth in Table III, it can be seen that neither the total salinity nor the divalent metal ion content of the brines had an adverse impact upon the viscosity yield. In fact it will be noted that the highest viscosities were generally obtained in the high salinity brine A.

TABLE III

| Shear Rate, Sec$^{-1}$ | Polymer Conc., % | Brine A | | Brine B | | Brine C | |
|---|---|---|---|---|---|---|---|
| | | 1.0 | 1.5 | 1.0 | 1.5 | 1.0 | 1.5 |
| 0.37 | Viscosity, cp. | 12.00 | 38.00 | 12.00 | 26.00 | 16.00 | 30.00 |
| 0.73 | | 10.00 | 28.00 | 12.00 | 21.00 | 11.00 | 26.00 |
| 1.84 | | 8.40 | 25.20 | 7.60 | 18.80 | 6.80 | 18.40 |
| 3.67 | | 7.20 | 22.80 | 6.60 | 17.60 | 5.60 | 15.80 |
| 7.34 | | 6.70 | 21.00 | 5.80 | 16.30 | 5.00 | 14.00 |
| 14.68 | | 6.25 | 19.30 | 5.25 | 14.95 | 4.65 | 12.40 |

TABLE III-continued

| Shear Rate, Sec$^{-1}$ | Polymer Conc., % | Brine A | | Brine B | | Brine C | |
|---|---|---|---|---|---|---|---|
| | | 1.0 | 1.5 | 1.0 | 1.5 | 1.0 | 1.5 |
| 36.71 | | 5.74 | 16.66 | 4.78 | 13.14 | 4.30 | 10.98 |
| 73.42 | | 5.40 | — | 4.56 | — | 4.18 | — |

The amphoteric polyelectrolyte may be employed in accordance with the present invention in any suitable concentration depending upon the desired viscosity of the displacing medium. Normally the mobility ratio of the reservoir oil to the injected water as defined, for example, in U.S. Pat. No. 3,025,237 to Roper, should be equal to or less than 1. In many cases, the relative permeabilities of the reservoir to oil and water are discounted in arriving at the mobility ratio or, stated otherwise, the desired viscosity of the mobility control fluid is equal to or greater than the viscosity of the reservoir oil. Typically the thickened water injected for mobility control purposes exhibits a viscosity in the range of 1 to 4 times that of the reservoir oil.

As noted previously, the viscosity yield of the amphoteric polyelectrolyte is related to its molecular weight and also to its configuration. Where the amphoteric polyelectrolyte employed is a block copolymer, it is preferred that it exhibit a molecular weight of at least 50,000 for adequate thickening of the injection water without the use of excessively high polymer concentrations. Where the amphoteric polyelectrolyte is a random copolymer, it desirably should have a molecular weight of at least 500,000 in view of these same considerations.

The viscosity yield of the amphoteric polyelectrolyte is also related to the relative amount of water-insoluble polymer units or polymer blocks. As a general rule, the critical micelle concentration is reduced and the viscosity yield at a given polymer concentration is increased by increasing the proportionate amount of water-insoluble polymer blocks up to a point less than that at which the total polymer becomes water-insoluble. The water solubility of the amphoteric polyelectrolyte is inversely related to the proportion of water-insoluble polymer blocks and as a practical matter the copolymer should contain at least 20% by weight of the vinyl pyridinium sulfonate units.

A preferred class of amphoteric polyelectrolytes for use in the present invention is vinyl pyridinium sulfonate-styrene block copolymers characterized by the formula:

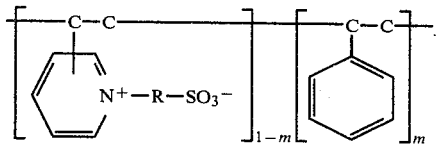

(2)

wherein R is a $C_1$-$C_4$ alkylene group and m is a mole fraction within the range of 0.2-0.9. The value of m may vary within the aforementioned range depending upon the salinity of the water and the desired viscosity yield. For example, the copolymer employed in the previously described experimental work was soluble with some difficulty in distilled water but was readily soluble in all of the brine solutions employed. Thus, the relative amount of vinyl pyridinium sulfonate in the polymer may be lower in the more saline solutions than in relatively fresh solutions. Preferably the value of m is within the range of 0.5-0.8 in order to provide for an enhanced viscosity yield of the amphoteric polyelectrolyte at relatively low polymer concentrations.

As indicated by formulas (1) and (2), the quaternized nitrogen may be at the 2, 3 or 4 position with respect to the vinyl group. However, it is preferred that the amphoteric polyelectrolyte comprise 2-vinyl pyridinium sulfonate since in this position the amphoteric structure tends to stiffen the polymer backbone. The amphoteric polyelectrolyte may be derived from mixtures of 2- and 4-vinylpyridine since this is a readily available commercial product. Preferably R contains 3 or 4 carbon atoms since these derivatives can be easily prepared by the reaction of the vinylpyridine polymeric units with propane sultone or butane sultone. Usually it will be desirable or preferred to effect sulfonation through the use of propane sultones since the addition reaction of sultone with the vinylpyridine proceeds readily under relatively moderate temperature conditions, as evidenced by the above example.

A preferred application of the present invention is in reservoirs exhibiting relatively high temperatures of 60° C. or above and in reservoirs in which the connate water or the available flooding medium contains high concentrations of salt and significant divalent metal ion concentrations which are inconsistent with the use of conventional anionic polyelectrolytes such as partially hydrolyzed polyacrylamides or hydrophobic-hydrophilic block copolymers containing such structures. Thus a preferred application of the present invention is in those situations in which the reservoir waters and/or the waters employed in formulating the flooding medium exhibit a divalent metal ion concentration of at least 0.1 weight percent. A similar consideration applies with regard to those situations in which the reservoir and/or injection waters exhibit moderate to relatively high salinities even though the divalent metal ion concentration may be low. Thus another application of the invention is in those situations in which the reservoir water and/or injection waters have salinities of at least 1.0 weight percent regardless of whether provided by monovalent salts such as sodium chloride or divalent salts such as calcium or magnesium chloride.

The thickened aqueous solution of amphoteric polyelectrolyte may be employed in conjunction with various other additives such as surface-active agents which are added to the injected water in order to reduce the oil-water interfacial tension. The amphoteric polyelectrolyte may be employed in the surfactant slug or employed as a separate mobility control slug injected subsequent to the aqueous solution of surface-active agent. The amphoteric polyelectrolyte may be added in concentrations so as to provide a graded viscosity at the trailing edge of the mobility control slug as described for example in Foster, W. R., "A Low-Tension Waterflooding Process", Journal of Petroleum Technology, Vol. 25, February 1973, pp. 205–210. Alternatively, the amphoteric polymer may be employed in concentrations to provide graded viscosities at both the leading and trailing edges of the mobility control slug as disclosed in U.S. Pat. No. 4,018,281 to Chang or the thickening agent concentration may be relatively constant throughout the mobility control slug. In any case, it normally will be desirable to employ the amphoteric polyelectrolyte in a concentration such that the viscosity of at least a portion of the mobility control slug is equal to or greater than that of the reservoir oil as described previously. Typically, the mobility control slug will be injected in an amount within the range of 0.2 to 0.6 pore volume.

We claim:

1. In a method for the recovery of oil from an oil-containing subterranean reservoir penetrated by spaced injection and production systems wherein fluid is introduced into said reservoir via said injection system to displace oil therein to said production system, the improvement comprising employing as at least a portion of the fluid introduced into said injection system an aqueous liquid containing a water-soluble copolymer having a molecular weight of at least 50,000 and including at least 20% by weight of quaternary pyridinium sulfonate monomers of the formula:

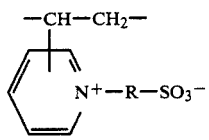

wherein R is a $C_1$-$C_4$ alkylene group copolymerized with a water-insoluble alpha olefin or hydrogenated diene, said polymer being present in said aqueous liquid in a concentration sufficient to increase the viscosity thereof at the temperature of said reservoir.

2. The method of claim 1 wherein R is a —$C_3H_6$— group.

3. The method of claim 1 wherein said copolymer is a block copolymer having a molecular weight distribution within the range of 1.0–1.4 as defined by the ratio:

$M_w/M_n$ wherein:

$M_w$ is the weight average molecular weight of said copolymer, and $M_n$ is the number average molecular weight of said copolymer.

4. The method of claim 1 wherein said polymer is a vinyl pyridinium sulfonate-styrene block copolymer characterized by the formula:

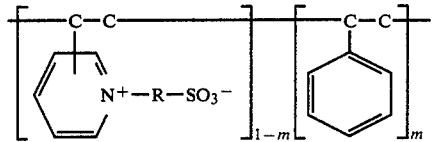

wherein

R is a $C_1$-$C_4$ alkylene group and m is a mole fraction within the range of 0.2–0.9.

5. The method of claim 4 wherein said copolymer contains 2-vinyl pyridinium sulfonate.

6. The method of claim 4 wherein m is a mole fraction within the range of 0.5 to 0.8.

7. The method of claim 4 wherein said block copolymer has a molecular weight distribution within the range of 1.0–1.4 as defined by the ratio:

$M_w/M_n$ wherein:

$M_w$ is the weight average molecular weight of said copolymer, and $M_n$ is the number average molecular weight of said copolymer.

8. The method of claim 4 wherein R is a —$C_3H_6$— group.

9. The method of claim 4 wherein said aqueous liquid has a divalent metal ion concentration of at least 0.1 weight percent.

10. The method of claim 4 wherein said subterranean reservoir contains water having a divalent metal ion concentration of at least 0.1 weight percent.

* * * * *

UNITED STATES PATENT AND TRADEMARK OFFICE
CERTIFICATE OF CORRECTION

PATENT NO. : 4,222,881

DATED : September 16, 1980

INVENTOR(S) : Don E. BYHAM, Edward W. SHEPPARD and Catherine S. H. CHEN

It is certified that error appears in the above-identified patent and that said Letters Patent are hereby corrected as shown below:

Column 1, line 62, "Kraats" should read --van de Kraats--.

Signed and Sealed this

Third Day of February 1981

[SEAL]

Attest:

RENE D. TEGTMEYER

Attesting Officer  Acting Commissioner of Patents and Trademarks